(12) United States Patent
Tanaka et al.

(10) Patent No.: US 7,706,944 B2
(45) Date of Patent: Apr. 27, 2010

(54) PARKING ASSIST DEVICE

(75) Inventors: Yu Tanaka, Aichi-ken (JP); Toshiaki Kakinami, Nagoya (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 3 days.

(21) Appl. No.: 11/312,454

(22) Filed: Dec. 21, 2005

(65) Prior Publication Data

US 2006/0136109 A1 Jun. 22, 2006

(30) Foreign Application Priority Data

Dec. 21, 2004 (JP) ............................. 2004-369136

(51) Int. Cl.
*B62D 6/00* (2006.01)
*B62D 11/00* (2006.01)
*G05D 1/00* (2006.01)

(52) U.S. Cl. ............................. 701/41; 701/36; 180/199; 280/761; 340/932.2; 340/988; 382/103; 382/106

(58) Field of Classification Search ............... 701/41, 701/36; 180/199; 280/199; 340/932.2, 988; 382/103, 106
See application file for complete search history.

(56) References Cited

U.S. PATENT DOCUMENTS

| 4,931,930 | A  | * | 6/1990  | Shyu et al.      | 701/36    |
|-----------|----|---|---------|------------------|-----------|
| 5,384,524 | A  | * | 1/1995  | Romano           | 318/569   |
| 5,402,475 | A  | * | 3/1995  | Lesner et al.    | 379/106.11|
| 5,504,314 | A  | * | 4/1996  | Farmont          | 235/384   |
| 5,845,268 | A  | * | 12/1998 | Moore            | 705/418   |
| 6,081,206 | A  | * | 6/2000  | Kielland         | 340/937   |
| 6,285,297 | B1 | * | 9/2001  | Ball             | 340/932.2 |
| 6,344,805 | B1 | * | 2/2002  | Yasui et al.     | 340/932.2 |
| 6,356,828 | B1 | * | 3/2002  | Shimizu et al.   | 701/41    |
| 6,424,895 | B1 | * | 7/2002  | Shimizu et al.   | 701/41    |
| 6,587,760 | B2 | * | 7/2003  | Okamoto          | 701/1     |
| 6,654,670 | B2 | * | 11/2003 | Kakinami et al.  | 701/1     |
| 6,657,555 | B2 | * | 12/2003 | Shimizu et al.   | 340/932.2 |
| 6,694,259 | B2 | * | 2/2004  | Curbow et al.    | 701/213   |
| 6,704,653 | B2 | * | 3/2004  | Kuriya et al.    | 701/301   |
| 6,778,891 | B2 | * | 8/2004  | Tanaka et al.    | 701/41    |

(Continued)

FOREIGN PATENT DOCUMENTS

DE        29 01 504  B1    6/1980

(Continued)

*Primary Examiner*—Khoi Tran
*Assistant Examiner*—Jorge O Peche
(74) *Attorney, Agent, or Firm*—Sughrue Mion, PLLC

(57) ABSTRACT

A parking assist device detecting a parking stall line from an image, which is captured by a capturing portion; setting a parking target position on the basis of the parking stall line; and assisting the vehicle to travel to the parking target position; the parking assist device includes a vehicle detecting portion for detecting a movement of the vehicle, a memorizing portion for memorizing the movement detected by the vehicle detecting portion, as a vehicle moving trajectory, a temporary parking target position estimating portion for assuming a temporary parking target position on the basis of variations of the vehicle moving trajectory, which has been memorized by the memorizing portion, and a parking stall line searching area setting portion for setting a parking stall line searching area, within which a parking stall line is searched on the basis of the temporary parking target position.

10 Claims, 14 Drawing Sheets

U.S. PATENT DOCUMENTS

| | | | |
|---|---|---|---|
| RE38,626 E * | 10/2004 | Kielland | 340/937 |
| 6,950,035 B2 * | 9/2005 | Tanaka et al. | 340/932.2 |
| 7,012,549 B2 * | 3/2006 | Mizusawa et al. | 340/932.2 |
| 7,043,346 B2 * | 5/2006 | Kubota et al. | 701/28 |
| 7,053,795 B2 * | 5/2006 | Maemura et al. | 340/932.2 |
| 7,058,207 B2 * | 6/2006 | Iida et al. | 382/104 |
| 7,069,128 B2 * | 6/2006 | Iwama | 701/36 |
| 7,116,246 B2 * | 10/2006 | Winter et al. | 340/932.2 |
| 7,257,486 B2 * | 8/2007 | Shimazaki et al. | 701/300 |
| 7,295,227 B1 * | 11/2007 | Asahi et al. | 348/118 |
| 7,366,595 B1 * | 4/2008 | Shimizu et al. | 701/301 |
| 2001/0017591 A1 * | 8/2001 | Kuriya et al. | 340/932.2 |
| 2002/0041239 A1 * | 4/2002 | Shimizu et al. | 340/932.2 |
| 2002/0128750 A1 * | 9/2002 | Kakinami et al. | 701/1 |
| 2003/0045973 A1 * | 3/2003 | Okamoto | 701/1 |
| 2003/0074129 A1 * | 4/2003 | Curbow et al. | 701/200 |
| 2003/0078713 A1 * | 4/2003 | Tanaka et al. | 701/41 |
| 2004/0015290 A1 * | 1/2004 | Curbow et al. | 701/117 |
| 2004/0119610 A1 * | 6/2004 | Maemura et al. | 340/932.2 |
| 2004/0257244 A1 * | 12/2004 | Kubota et al. | 340/932.2 |
| 2006/0069478 A1 * | 3/2006 | Iwama | 701/36 |

FOREIGN PATENT DOCUMENTS

| | | |
|---|---|---|
| DE | 100 41 381 A1 | 4/2001 |
| EP | 1 249 379 A2 | 10/2002 |
| EP | 1 469 422 A1 | 10/2002 |
| EP | 1 270 367 A2 | 1/2003 |
| EP | 1 468 893 A2 | 10/2004 |
| JP | 1984-201082 A | 11/1984 |
| JP | 1994-111198 A | 4/1994 |
| JP | 11-208420 A | 8/1999 |
| JP | 2000-79860 A | 3/2000 |
| JP | 2003-205807 A | 7/2003 |

* cited by examiner

PARKING ASSIST DEVICE

CROSS REFERENCE TO RELATED APPLICATIONS

This application is based on and claims priority under 35 U.S.C. §119 to Japanese Patent Application 2004-369136, filed on Dec. 21, 2004, the entire content of which is incorporated herein by reference.

FIELD OF THE INVENTION

The present invention relates to a parking assist device for assisting a parking operation.

BACKGROUND

A known parking assist device disclosed in JP59-201082A assists a vehicle to be parked into a parking stall as follows. First, the known parking assist device detects an actual steering angle by means of a steering sensor, and then, on the basis of a detected vehicle position and a predetermined data, which relates to a parking operation and previously inputted into the parking assist device. Then, the parking assist device calculates a required steering angle, which is required for the parking operation and displaying the required steering angle, is calculated, and further, and finally the parking assist device displays an instructing angle, which is required for operating the steering in order to park the vehicle into the parking stall, on a simple display means. Because the parking assist device disclosed in JP59-201082A calculates the steering angle on the basis of only the steering sensor, an error on detecting relative positions between the vehicle and the parking stall has been occurred. In consideration of such errors, parking assist devices disclosed in JP6-111198A, JP11-208420A, JP2000-079860A and JP2003-205807A, detect a parking target position after processing a rear image that is captured by, for example a CCD camera (charge-coupled device camera).

Specifically, the parking assist device disclosed in JP6-111198A captures a predetermined area around the vehicle including a parking stall by means of the CCD camera, calculates distances from the vehicle to the parking stall in each azimuth, and selects a single distance which is shortest, and set it as an entrance of the parking stall. Specifically, the parking assist device disclosed in JP11-208420A superposes an image that indicating a temporary parking target position of the vehicle on the captured image and sets a parking target position by adjusting the temporary parking target position by a position adjusting means such as a touch panel. More specifically, the parking assist device disclosed in JP2000-079860A sets a specific area of window in the vicinity of a white line and recognizes a parking stall depending on feature and the geometrical arrangement of the white line. Furthermore, in the light of a driving characteristic of a driver who generally passes in front of a parking target position and then turns the vehicle in order to park the vehicle into the target position, the parking assist device disclosed in JP2003-205807A assumes a parking target position on the basis of a running state of the vehicle before the parking operation and a moving locus and sets an initial displaying position within an adjusting frame for setting a target of the parking.

However, because the known parking assist device disclosed in JP6-111198A uses the image captured by the camera without applying any process, the parking target position cannot be detected accurately due to external elements such as a parking stall line of another parking stall, an image of another vehicle, which can be an obstacle, and a shadow of a building. In such case, it may be considered that an accurate parking target position can be obtained by executing the calculating operation over and over again, however, such measure is not general for the image data processing operation. The known parking assist device disclosed in JP2000-079860A processes within a certain area of the captured image, which is regulated by the window, in order to detect the parking stall line, so that another vehicle that may be an obstacle or element such as a background image, which may result in disturbance (brightness, a shadow of the vehicle and dirt on a road surface), can be eliminated. However, because the known parking assist device disclosed in JP2000-079860A needs to move the vehicle until the guide line reaches the target parking stall, the user need to do an extra operation. Thus, the level of easiness to park the vehicle by means of the parking assist device, which can rotates the wheel automatically, has been reduced.

Further, according to the known parking assist device disclosed in JP11-208420A, the driver need to adjust the temporary parking target position in order to set the parking target position correctly, as a result, the driver also need to do an extra operation, for example moving the temporary parking target position in a vertical direction and in a horizontal direction for each 2 dots, and setting the angle of the parking target position.

Furthermore, according to the known parking assist device disclosed in JP2003-205807A, because the vehicle moving locus may differs depending on levels of driving techniques or situations of the parking stall, for example, a position of another vehicle, which is parked in the vicinity of the target parking stall, it can be determined that the driver intends to park the vehicle into one of the left and the right parking stalls, however, the parking target position may be out of the parking stall. Thus, the driver need to adjust the adjusting frame displayed on the display by position adjusting means such as a touch panel in order to readjust the parking target position, as a result, it takes some time for the driver to set the parking target position.

A need thus exists to provide a parking assist device that can set a parking target position with high speed and high accuracy and can reduce burden on the user for setting the parking target position of the parking assist device.

SUMMARY OF THE INVENTION

According to an aspect of the present invention, a parking assist device detecting a parking stall line, which indicates a parking stall within a parking space, from an image, which is captured by a capturing means; setting a parking target position on the basis of the parking stall line; and assisting the vehicle to travel to the parking target position; the parking assist device includes a vehicle detecting means for detecting a movement of the vehicle, a memorizing means for memorizing the movement, which has been detected by the vehicle detecting means, as a vehicle moving trajectory, a temporary parking target position estimating means for assuming a temporary parking target position on the basis of variations of the vehicle moving trajectory, which has been memorized by the memorizing means, and a parking stall line searching area setting means for setting a parking stall line searching area, within which a parking stall line is searched on the basis of the temporary parking target position, which is assumed by the temporary parking target position estimating means.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
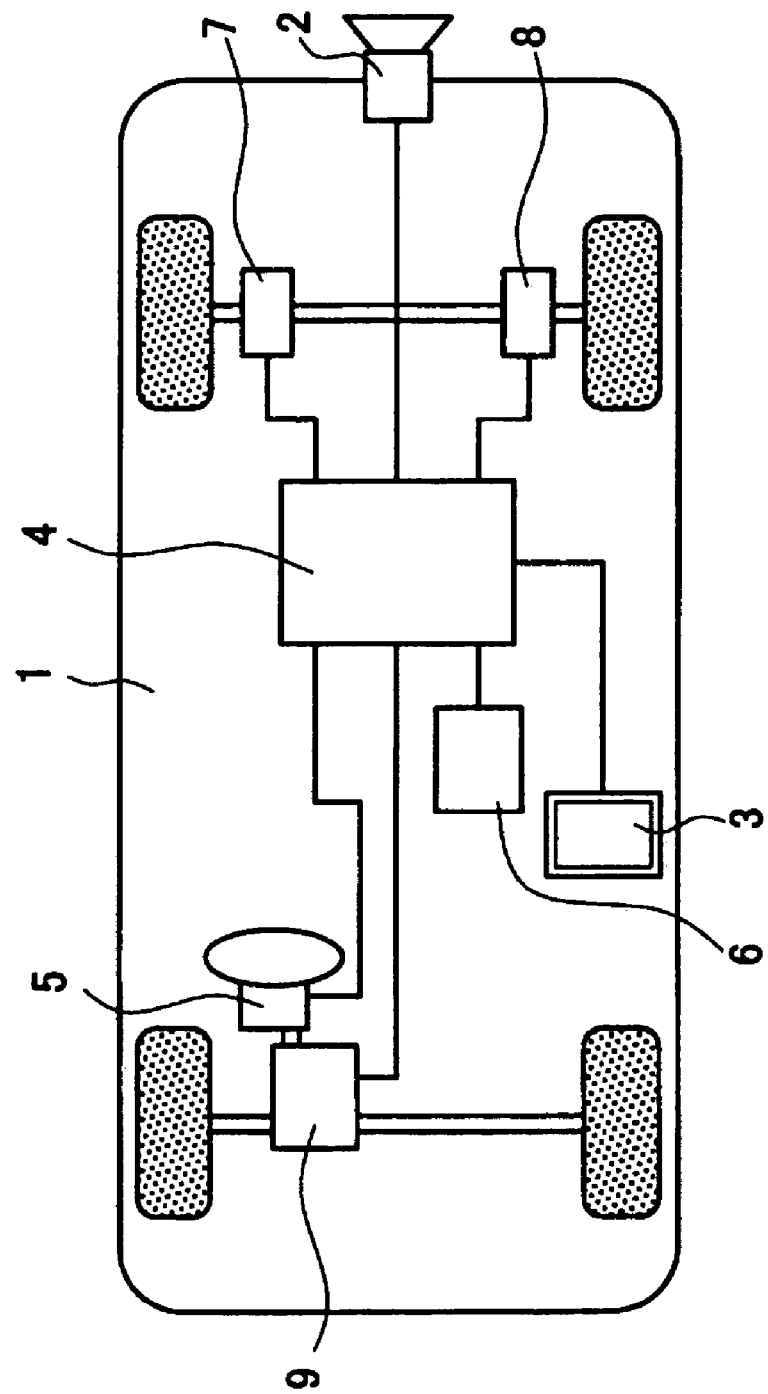
FIG. 1 illustrates a diagram indicating a schematic configuration of a vehicle to which a parking assist device is mounted according to an embodiment of the present invention.

An embodiment of a parking assist device according to the present invention will be explained hereinbelow in accordance with attached drawings. FIG. 1 illustrates a diagram indicating a schematic configuration of a vehicle 1 to which a parking assist ECU (electric control unit) 4 (e.g., serving as a parking assist device) is mounted. The vehicle 1 includes a rear camera 2, a display 3, a calculating device 4 (hereinbelow referred to as a parking assist ECU), a steering angle sensor 5, a shift lever reverse switch 6 (parking assist instruction switch), a rear-right wheel speed sensor 7, a rear-left wheel speed sensor 8, a steering actuator 9. In this embodiment, the parking assist ECU 4 configures the parking assist device.

The rear camera 2 (e.g., serving as a capturing means) is attached to the rear portion of the vehicle. Specifically, the rear camera is attached, for example, at the central portion in a vehicle width direction and above the number plate. The rear camera 2 is provided in a manner where its optical axis is tilted downward. The rear camera 2 includes a wide-angle lens, which covers a wide angle of view, such as 140 degrees, and captures a rear view within a distance of 8 meter from the rear end of the vehicle.

The display 3 is mounted to a center console or a panel within the interior of the vehicle 1. Further, the display 3 displays an image captured by the rear camera 2 and superposes a parking target frame W on the displayed image. The parking assist ECU 4 detects a parking stall line within the image captured by the rear camera 2 in order to set a parking target position K. The parking assist ECU 4 further assists the vehicle 1 to travel to the parking target position k. A configuration of the parking assist ECU 4 will be described later in detail. The steering angle sensor 5, which is attached inside the steering, detects the steering angle when the steering is rotated, and then outputs steering angle signals to the parking assist ECU 4. The steering angle sensor 5 detects a rotation amount of a steering column shaft by means of an optical sensor or the like.

The shift lever reverse switch 6 is housed in the shift lever. Specifically, the shift lever reverse switch 6 is turned on when the shift is positioned to the reversed mode, and turned off when the shift is not positioned to the reversed mode. The rear-right wheel speed sensor 7 and the rear-left wheel speed sensor 8 include an active wheel speed sensor, which is attached to a wheel of the vehicle 1, and the steering actuator 9 outputs a force by which a load used for rotating the steering can be lightened.

Figure 2:
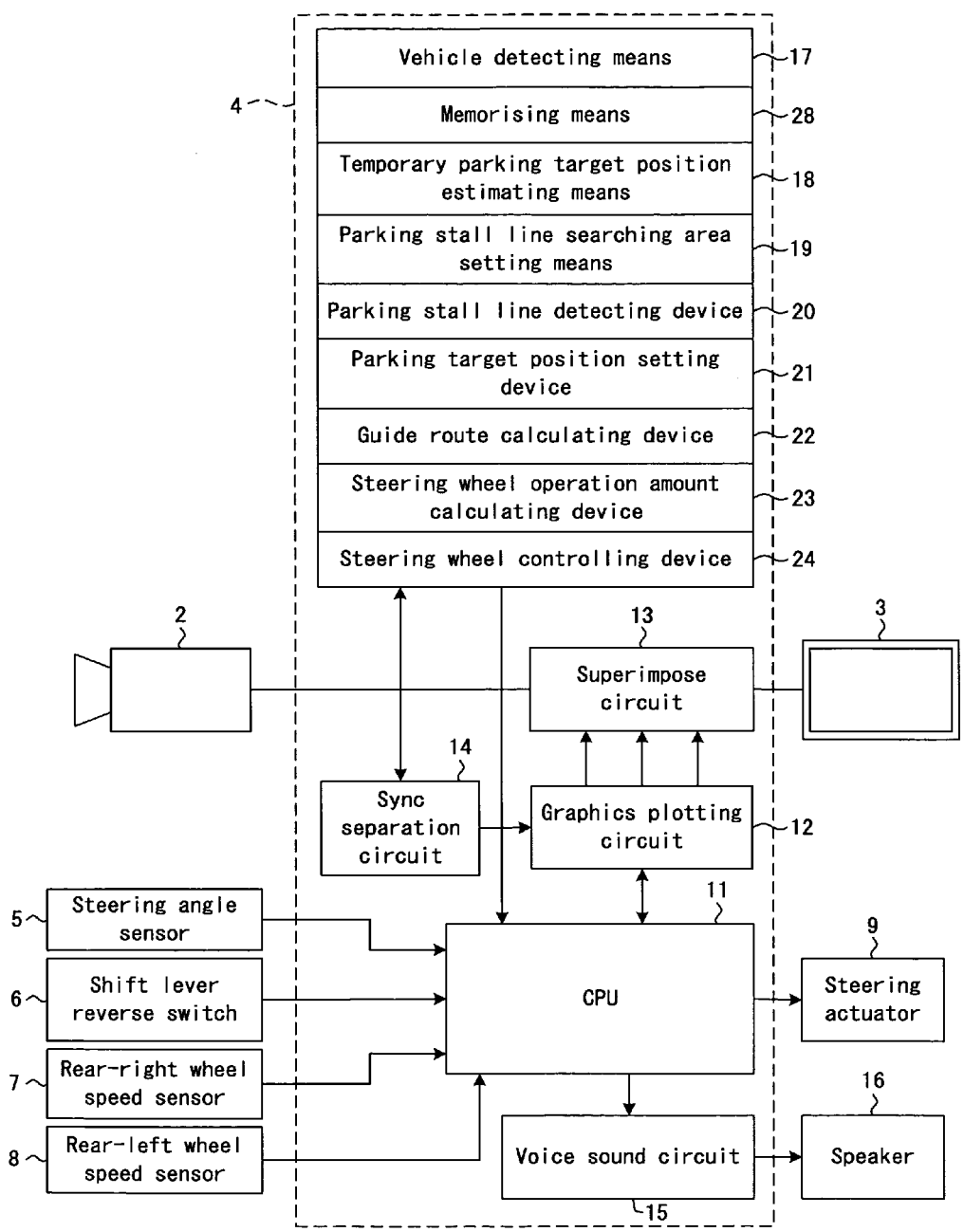
FIG. 2 illustrates a block diagram indicating the parking assist device.

A configuration of the parking assist ECU 4 will be explained. FIG. 2 illustrates a block diagram indicating the parking assist ECU 4. The parking assist ECU 4 mainly includes a CPU 11 for controlling the parking ECU 4, a graphics plotting circuit 12 for plotting a graphic image on the display 3, a superimpose circuit 13 for superimposing graphics signals on a rear image captured by the rear camera 2, a sync separation circuit 14 for selecting synchronized signals from the camera image and providing it to the graphics plotting circuit 12 and a voice sound circuit 15 for outputting audible guide tone through a speaker 16 of the vehicle 1. Further, the parking assist ECU 4 includes a vehicle detecting device (serving as a vehicle detecting means) 17, a memory (serving as a memorizing means) 28, a temporary parking target position estimating device (serving as a temporary parking target position estimating means) 18, a parking stall line searching area setting device (serving as a parking stall line searching area setting means) 19, a parking stall line detecting device 20, a parking target position setting device 21, a guide route calculating device(serving as a guide route calculating means) 22, a steering wheel operation amount calculating device (serving as a steering wheel operation amount calculating means) 23, and a steering wheel controlling device (serving as a steering wheel controlling means) 24.

The vehicle detecting device 17 detects a vehicle, which is moving, and the memory 28 memorizes a vehicle moving trajectory detected by the vehicle detecting device 17. In this embodiment, the vehicle moving trajectory includes the steering angle of the vehicle 1 and he wheel speed of the vehicle 1. In consideration of data capacity, the memory 28 always stores data of the latest trajectory (e.g., trajectory within seven meters), and once the memory reaches full capacity, old data will be deleted in order make the space for latest data. Thus, latest data can be sequentially memorized. The temporary parking target position estimating device 18 assumes a temporary parking target position k on the basis of a variation of the vehicle moving trajectory. The parking stall line searching area setting device 19 sets a parking stall line searching area S, which is used for searching a parking stall line T, on the basis of the temporary parking target position k. The parking stall line detecting device 20 detects the parking stall line T within a parking stall line searching area S. The parking target position setting device 21 set a parking target position K on the basis of the detected parking stall line T.

The guide route calculating device 22 calculates a guide route, which is used for guiding the vehicle to the parking target position K. The steering wheel operation amount calculating device 23 calculates a steering wheel operation amount of the vehicle 1 on the basis of the guide route. The steering wheel controlling device 24 automatically controls the operation of the steering wheel of the vehicle 1 on the basis of the steering wheel operation amount.

The steering angle sensor 5, the shift lever reverse switch 6, the rear-right wheel speed sensor 7, the rear-left wheel speed sensor 8 and the like are connected to the CPU 11, and each of them outputs detecting signals. Further, the steering actuator 9 is connected to the CPU 11 in order to adjust a force, which is used for rotating the steering, on the basis of control signals, which are outputted by the steering wheel controlling device 24. Thus, the steering wheel can be automatically operated.

Preceding an explanation of the processes of the parking assist ECU 4, a projection transformation for displaying a parking target position, which is required for image recognition, and a method for detecting a moving amount of a vehicle in order to recognize a moving locus of the vehicle 1, will be explained.

Figure 3:
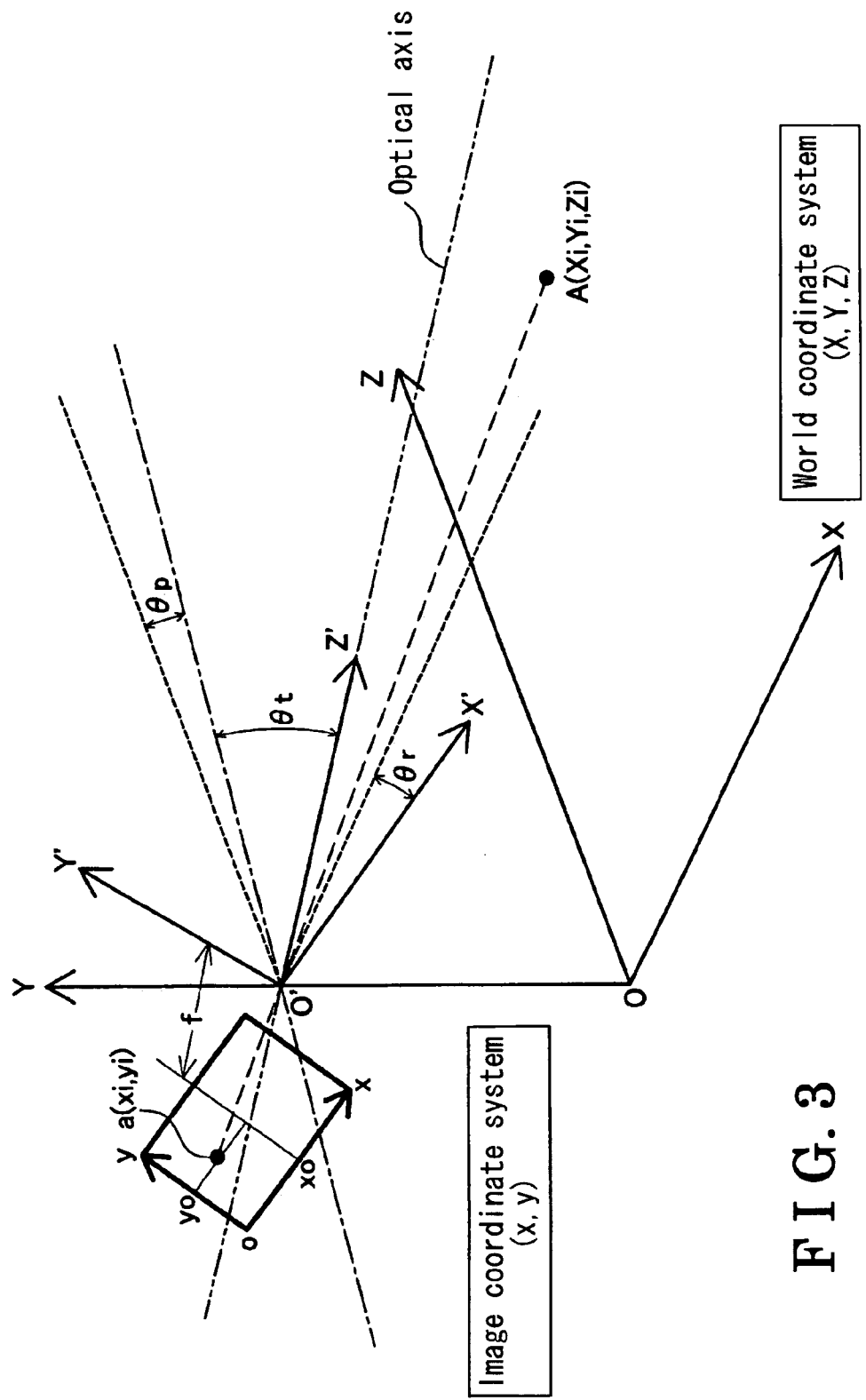
FIG. 3 illustrates a diagram indicating a coordinate transformation method of the parking assist device.

FIG. 3 illustrates a diagram indicating a coordinate conversion by means of the parking assist ECU 4. According to a projection transformation for displaying the parking target position, setting a world coordinate system, which is predetermined to a vehicle before starting the guide operation, to X-Y-Z, and setting an image coordinate system of the rear camera 2 to x-y, a plot point A (Xi, Yi, Zi) on the world coordinate is transformed into a point a (xi, yi) of the image coordinate on the basis of following Formula 1 and Formula 2.

$$a = P \begin{bmatrix} A \\ 1 \end{bmatrix} \qquad \text{Formula 1}$$

$$P = C[R/T] \qquad \text{Formula 2}$$

In these formulas, P indicates a projection transformation matrix of 3×4, C indicates a inner parameter of the camera, R indicates a rotational movement and T indicates a parallel movement. The parking target position calculated by the world coordinate system is transformed into the image coordinate system by the above formulas and then superposed on the camera image displayed on the display 3 in graphical plots.

Figure 4:
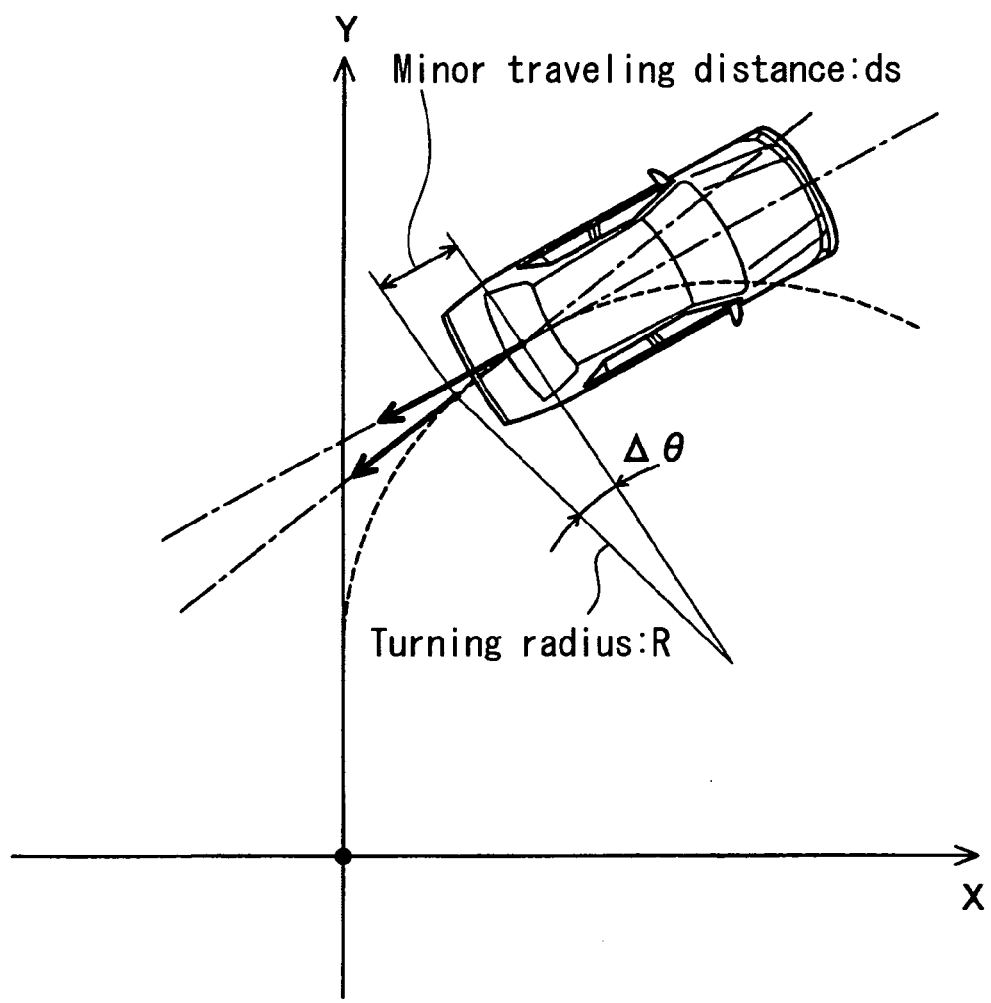
FIG. 4 illustrates a diagram indicating a method of the parking assist device for detecting a vehicle moving distance.

FIG. 4 illustrates a diagram indicating a method for detecting a moving distance of the vehicle 1 by the parking assist ECU 4. As shown in FIG. 4, the moving distance of the vehicle 1 can be calculated by the following Formulas 3, 4 and 5.

$$\theta = \int_0^a \frac{1}{R} \cdot ds \qquad \text{Formula 3}$$

$$X = \int_0^a \sin\theta \cdot ds \qquad \text{Formula 4}$$

$$Z = \int_0^a \cos\theta \cdot ds \qquad \text{Formula 5}$$

The "ds" indicates a minor moving distance and calculated on the basis of the rotation amount of the wheel that is detected by the vehicle wheel speed sensors 7 and 8 provided at the rear right and left wheels. The "R" indicates a turning radius of the vehicle 1 and calculated on the basis of a value detected by the steering angle sensor 5. The "α" indicates an accumulated moving distance from a position where the parking operation is started.

Figure 5:
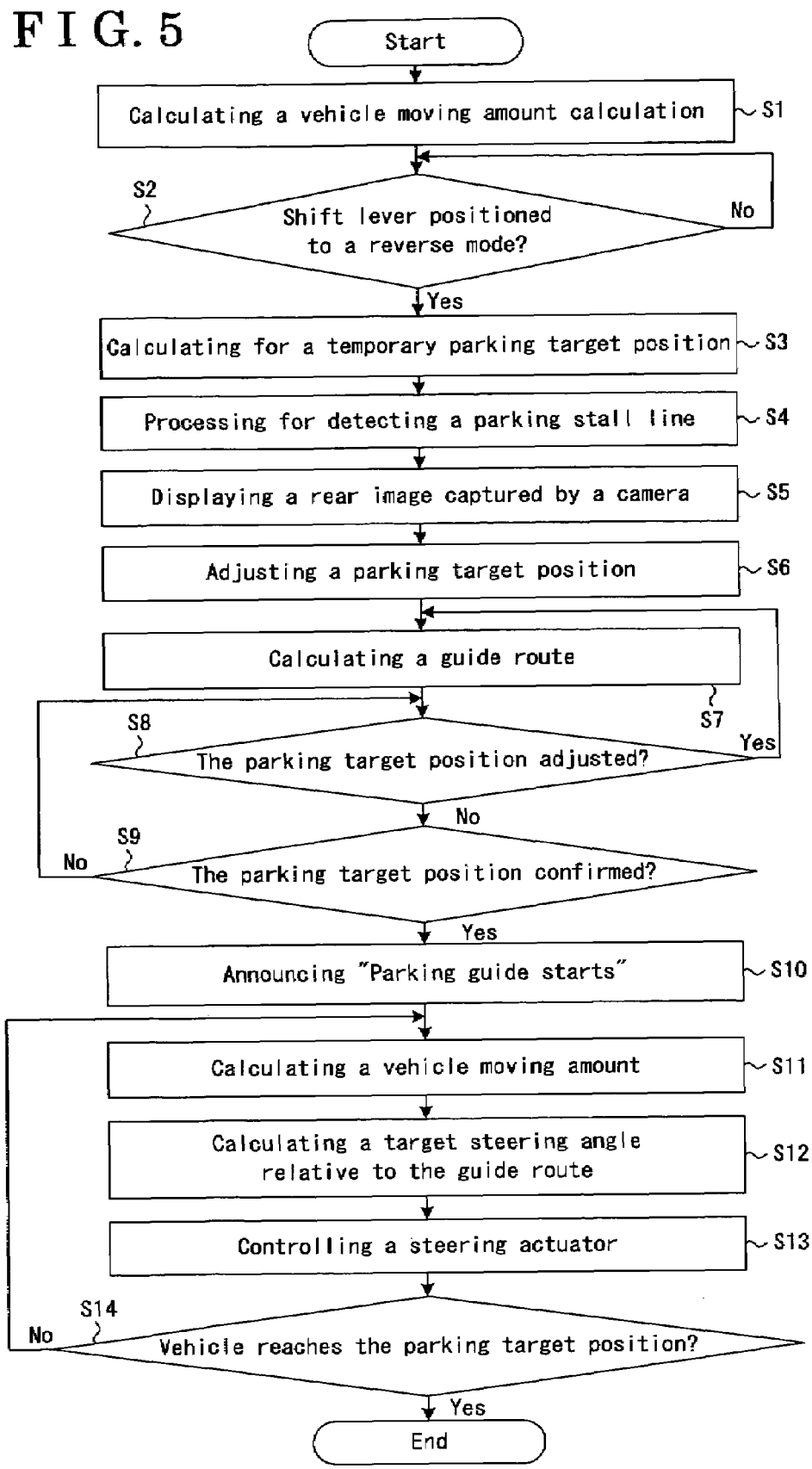
FIG. 5 illustrates a flow chart indicating a process executed by a CPU of the parking assist device.

FIG. 5 illustrates a flow chart indicating a process of the parking assist ECU 4. FIGS. 6 through 11 are explanation drawings that indicate the vehicle 1, which is backed-in so as to be parallel. When an accessory switch is turned on, the parking assist ECU 4 starts a program illustrates in the flowchart in FIG. 5.

Figure 6:
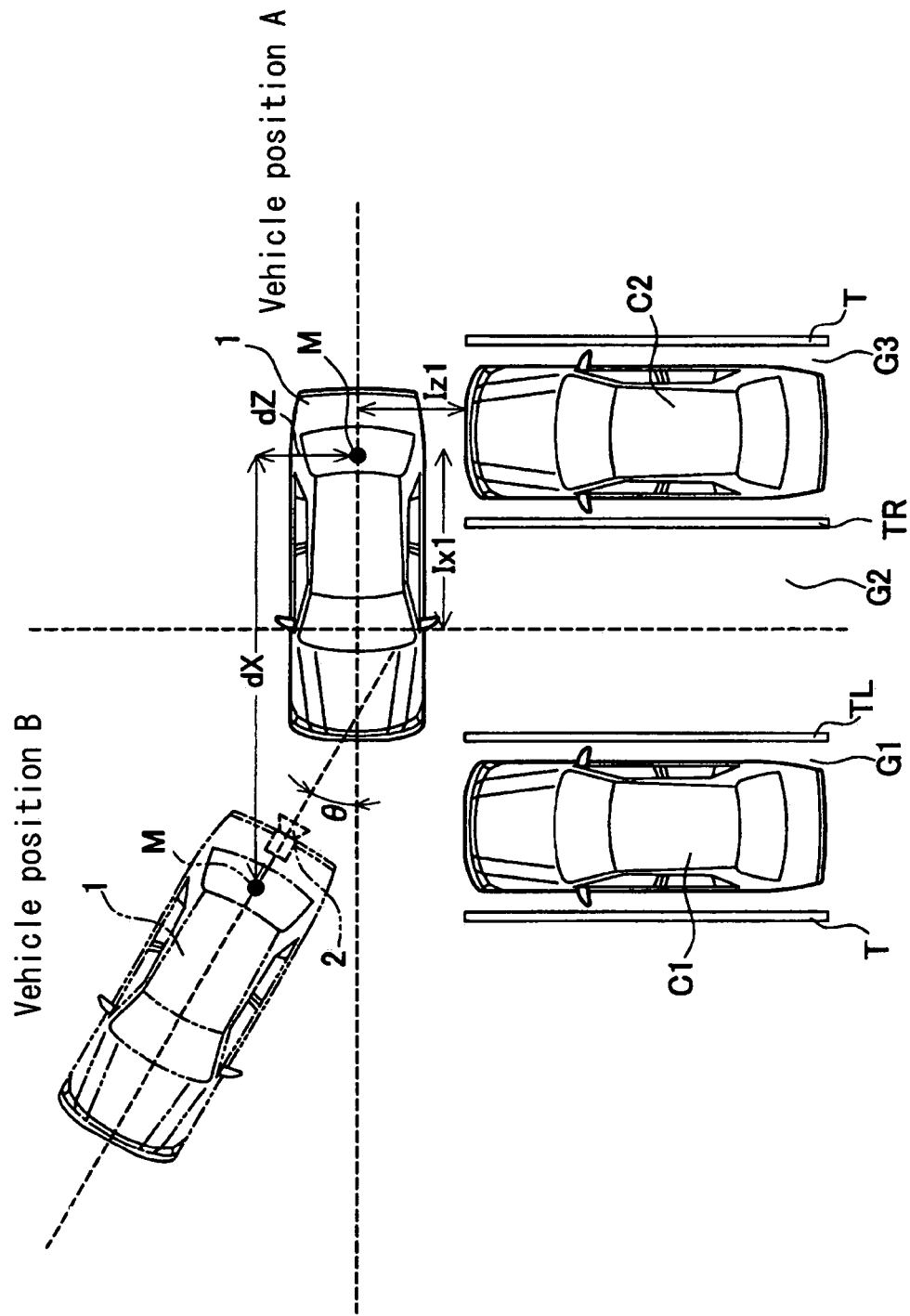
FIG. 6 illustrates an explanatory diagram indicating a condition of the vehicle when it is parked so as to be parallel.

For example, as shown in FIG. 6, when the driver intends to park the vehicle 1 into a parking stall G2, which is not occupied and provided so as to be parallel to parking stalls G1 and G3, which are occupied with another vehicles, a driver of the vehicle 1 usually temporally stops the vehicle 1 at a position where the driver can carefully observe the parking stall G2 in a manner where a drivers seat is positioned on a central line of the parking stall G2.

Figure 7:
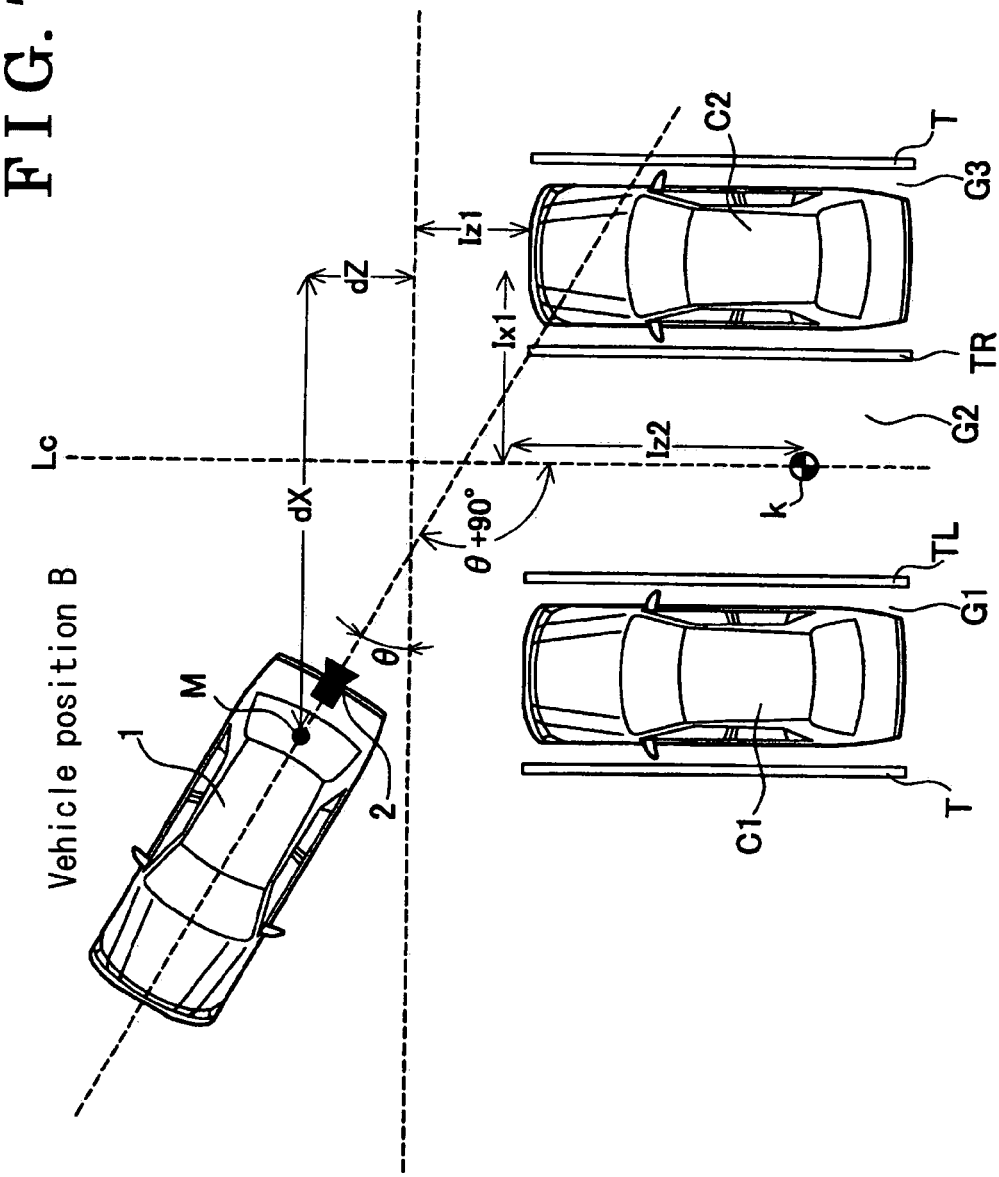
FIG. 7 illustrates an explanatory diagram indicating a condition of the vehicle when it is parked so as to be parallel and also indicating a temporary parking target position.

In a step 1 (herein below referred to as S1) in FIG. 5, considering that the temporary stop of the vehicle 1 at a vehicle position A as a trigger, the parking assist ECU 4 starts calculating a vehicle moving amount dX, dZ form the vehicle position A and θ relative to the vehicle position A. In other words, considering a right-left direction of the vehicle 1 as an X-axis, and a front-rear direction of the vehicle 1 as a Z-axis, dX and dZ are calculated on a basis of a central point M of the rear wheel shaft. Further, Ix1 shown in FIG. 7 is calculated as a distance from the central point M to the drivers seat, and Iz1 is calculated as a distance from the central point M to a point, which is distanced from the central point M at the distance of dZ in the opposite direction thereof relative to the axis Z. Then, as shown in FIG. 6, the driver moves and turns the vehicle 1 rightward from the vehicle position A to a vehicle position B in order to back-in the vehicle 1 into the parking stall G2, which is located, at this moment, at left hand of the vehicle.

In S2 in FIG. 5, the parking assist ECU 4 detect "on" or "off" of the shift lever reverse switch 6 in order to determine whether or not the shift is positioned to the reverse mode. When the vehicle 1 is moving toward the vehicle position B or stopping at the vehicle position B, because the shift lever reverse switch 6 is not turned on (S2: No), the parking assist ECU 4 becomes a stand-by mode.

When the driver positions the shift lever to the reversed mode in order to back the vehicle 1 into the parking stall G2, because the shift lever reverse switch 6 is turned on (S2: Yes), the parking assist ECU 4 goes to S3 and executes a calculation in order to assume the parking target position. In other words, considering that a right-left direction of the vehicle 1 as an X axis, and a front-rear direction of the vehicle 1 as Z axis, on the basis of values of dX, dZ, Ix1, Iz1 and Iz2, which are indicated in FIG. 7, a relative position of the temporary parking target position k relative to an assumed direction Lc of the parking stall G2 in X-Z coordinate system at the vehicle position B is calculated.

Specifically, the parking assist ECU 4 reads the vehicle moving trajectory of steering angle and the vehicle wheel speed from the memory 28 and calculates deflection angle θ of the vehicle 1 per unit time. Then, the parking assist ECU 4 determines whether or not the vehicle 1 moves forward from the deflection angle θ and the vehicle 1 turns with describing an arc. Generally, when the vehicle 1 is backed into the parking stall, which is positioned on the left hand, the driver of the vehicle 1 moves the vehicle 1 forward passing in front of the parking stalls G and turns the vehicle 1 in a right direction. On the other hand, when the vehicle 1 is backed into the parking stall, which is positioned on the right hand, the driver of the vehicle moves the vehicle forward assign through the parking stalls G and turns the vehicle 1 in a left direction. Thus, it can be predicted from the turning direction whether the vehicle 1 will be parked into the parking stall G on the left hand or the parking stall F on the right hand. In this embodiment, it is predicted that the vehicle 1 will be parked into the parking stall G2.

When the vehicle 1 is parked into the parking stall G2 located on the left hand, the driver moves the vehicle 1 backward from the vehicle position B, turns the steering wheel in a left direction, then moves the vehicle 1 straight-backward, as a result, the vehicle 1 can be parked into a parking stall G, which is located so as to be orthogonal relative to the Z axis of the vehicle position A. As shown in FIG. 7, the assumed direction Lc of the parking stall G is calculated as a straight line having a phase difference at a certain angle, which is calculated by adding an angle of 90 degrees to the deflection angle θ toward the parking stall G side relative to an optical axis of the vehicle position B. Further, the temporary parking target position k is calculated as a position relative to the vehicle position B in the X-Y coordinate series.

Figure 8:
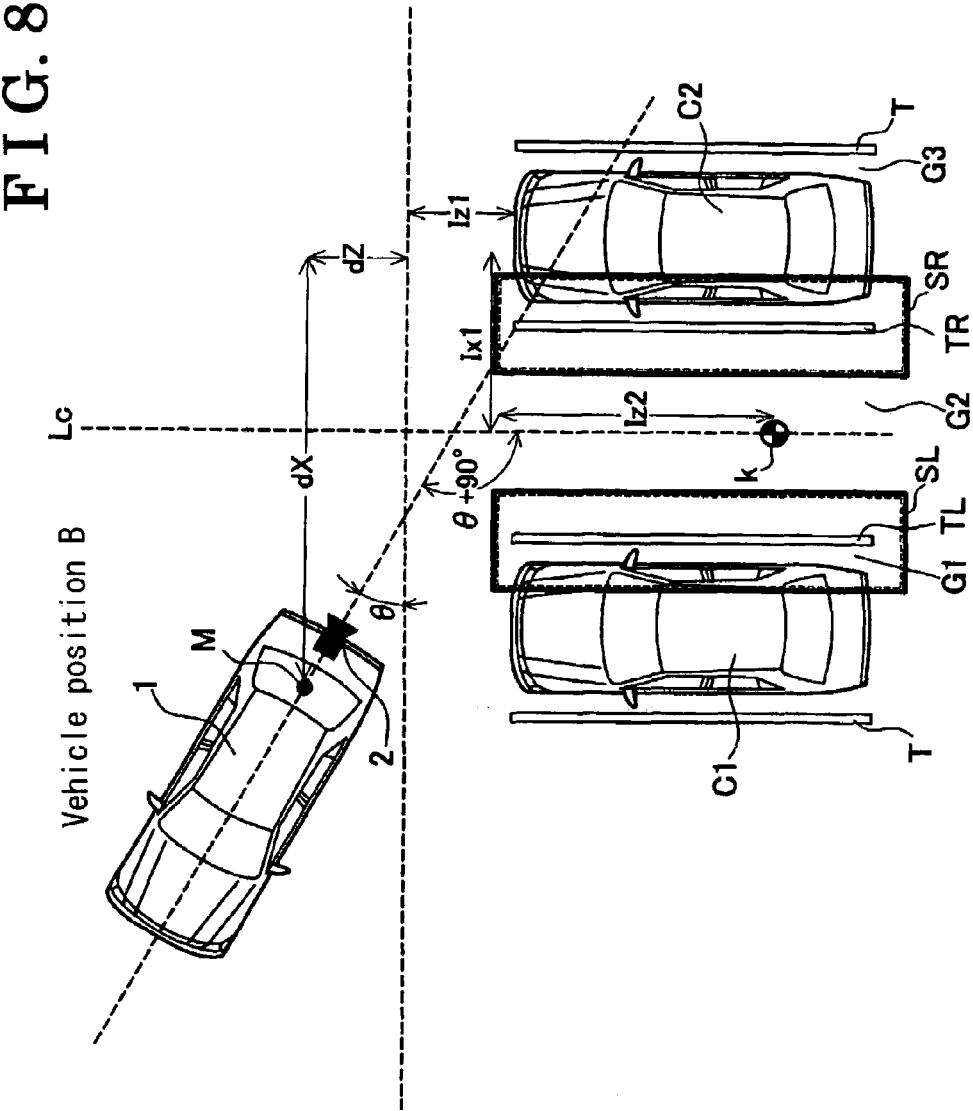
FIG. 8 illustrates an explanatory diagram indicating a condition of the vehicle when it is parked so as to be parallel and also indicating a parking stall line searching area.
Figure 9:
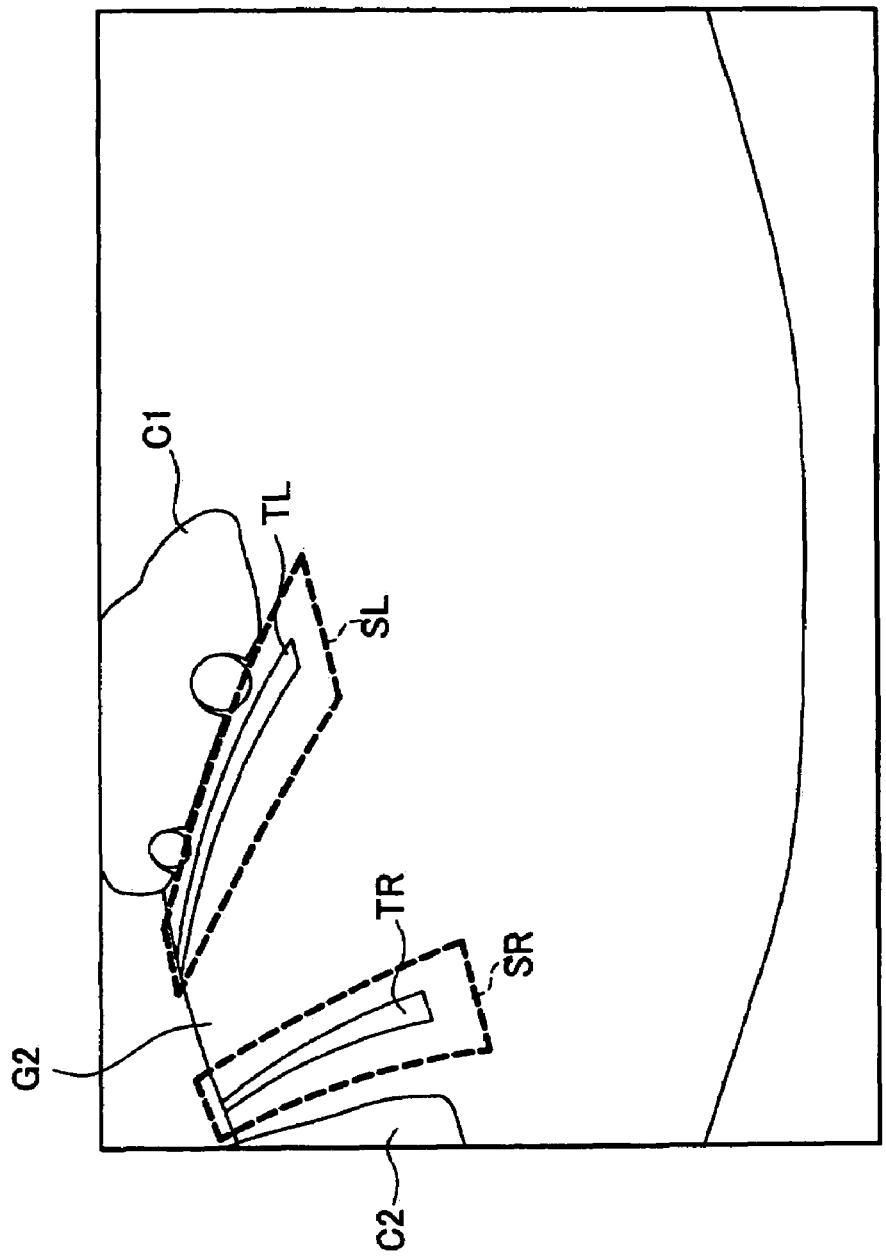
FIG. 9 illustrates a diagram indication the parking stall line searching area on a captured camera image.

Then, the process goes to S4 and executes a process for detecting the parking stall lines. Generally a right parking stall line TR and a left parking stall line TL, which are used for compartmentalizing the parking stall G, are approximately predetermined of their lengths, widths, distances therebetween. As shown in FIG. 8, on the basis of the temporary parking target position k and the assumed direction Lc of the parking stall G2, a position of the right parking stall line TR and a position of the left parking stall line TL are predicted, and further, a parking stall line searching area S, which is used for searching the right and left parking stall lines TL and TR are set. Specifically, a left parking stall line searching area SL, which are used for searching the left parking stall line TL, and a right parking stall line searching area SR, which are used for searching the right parking stall line TR, are set separately as the parking stall line searching area S. The left parking stall line searching area SL and the right parking stall line searching area SR are set so as to be wider than the size of the parking stall line T and so as not to include three parking stall lines T or more. Thus, even when the left parking stall line searching area SL and the right parking stall line searching area SR are set to be tilted relative to the left parking stall line TL and the right parking stall line TR, the right parking stall line TR can be included in the right parking stall searching area SR, and the left parking stall line TL can be included in the left parking stall searching area SL, at the same time, it can be prevented that plural parking stalls G are detected within the single parking stall line searching area R, as a result, chances that the parking stall line T is not detected or incorrectly detected can be reduced. For example, when a length of the parking stall line T is 5.5 m and a width of the parking stall line T is 10 cm, the length of each of the right and left parking stall line searching areas SL and SR is set to 6.5 m, and the width of each of the right and left parking stall line searching areas SL and SR is set to 1 m. FIG. 9 illustrates an image showing the right parking stall line searching area SR and the left parking stall line searching area SL, which are superposed on the rear image captured by the rear camera 2.

Figure 10:
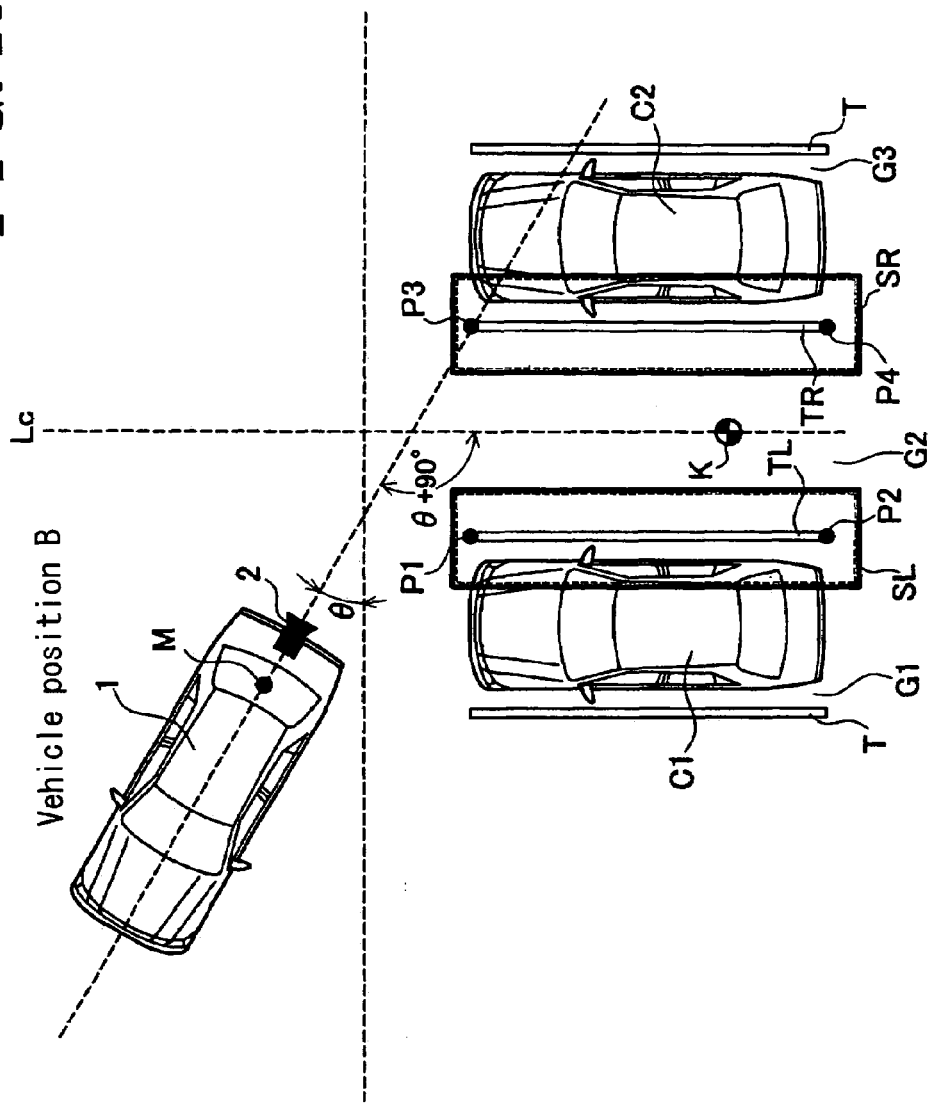
FIG. 10 illustrates an explanatory diagram indicating a condition of the vehicle when it is parked so as to be parallel and also indicating edges of parking stall lines.

Intensity differences and geometrical characteristics within the right parking stall line searching area SR and the left parking stall line searching area SL, which are superposed on the rear image captured by the rear camera as described above, are calculated, and on the basis of the calculated values, positions of the right parking stall line TR and the left parking stall line TL and positions of end points thereof are detected. Further, on the basis of these detected positions, a parking target position K is set as shown in FIG. 10. In this embodiment, the parking stall line T of the parking stall can be detected by use of a known Hough transformation.

Figure 11:
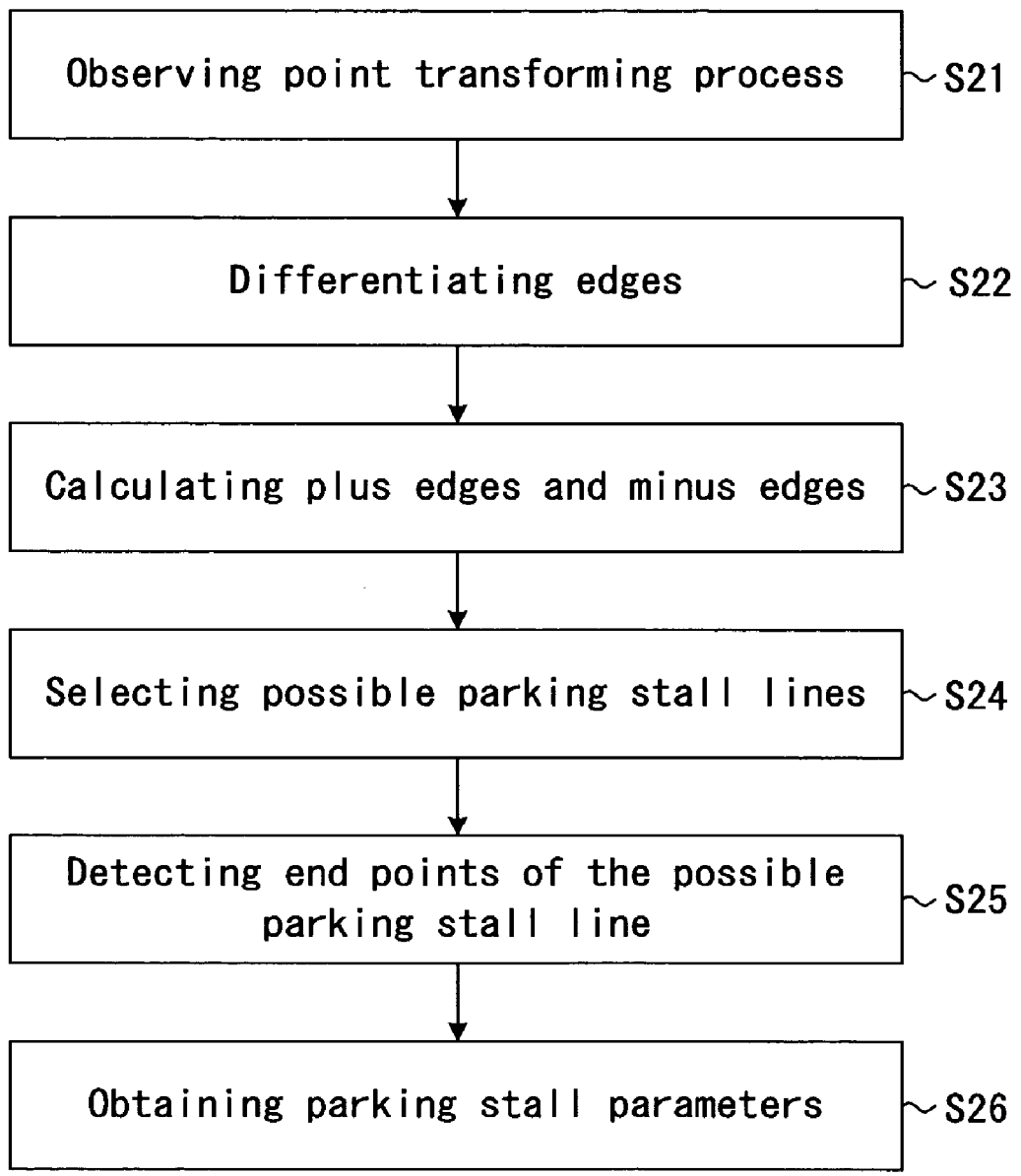
FIG. 11 illustrates a flow chart indicating a method for detecting a parking stall line of the parking stall.
Figure 12:
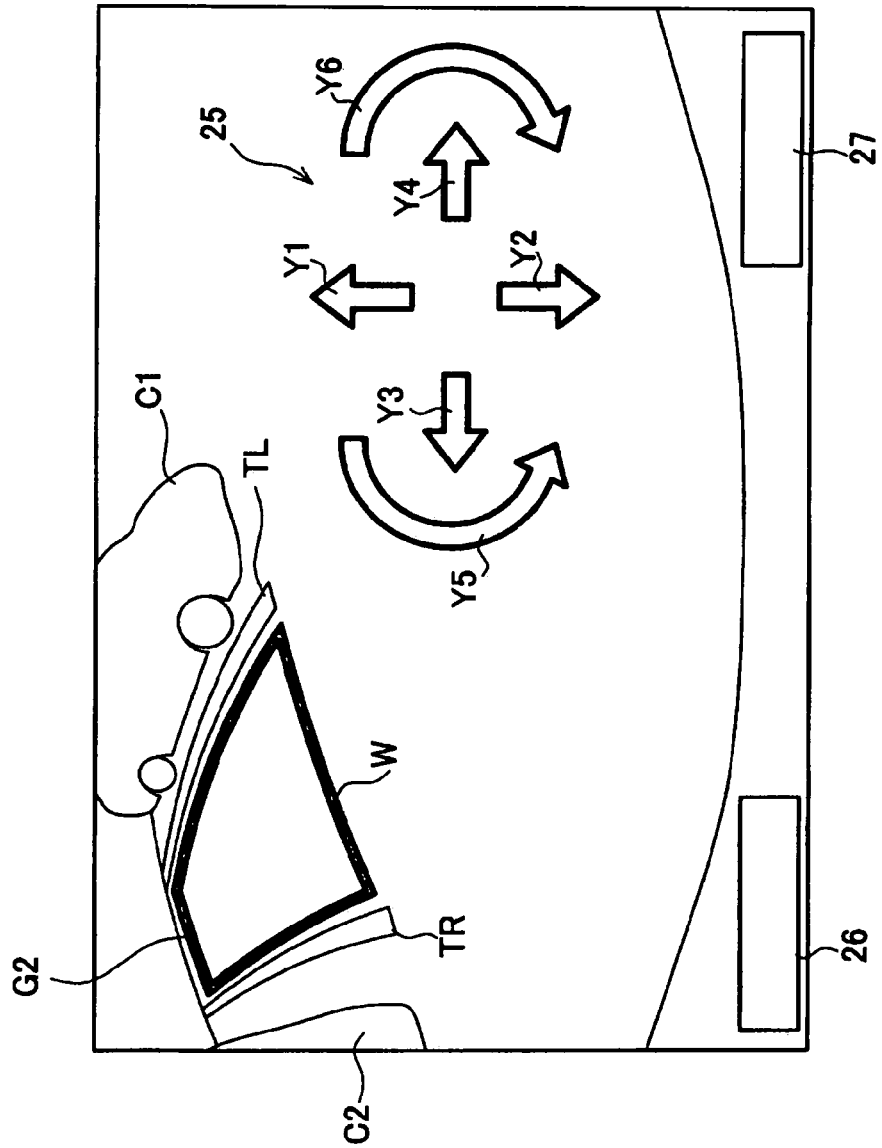
FIG. 12 illustrates a diagram indicating a displayed image.

FIG. 11 illustrates a flow chart indicating a method for detecting the parking stall line of the parking stall. First, in S21 in FIG. 11, an observing point transforming process is executed. Specifically, the image captured by the rear camera 2 is transformed from the world coordinate into the image coordinate. In S22, within the image whose observing point has been transformed into the image coordinate, the right and left parking stall line searching areas SR and SL are scanned with a spatial filter of 3×3 pixel in order to obtain intensities thereof, and such intensities are differentiated for each area corresponding to the spatial filter in order to obtain intensity differences. The process proceeds to S23, and each of the intensity differences is compared to a plus threshold and a minus threshold, and if the intensity difference is greater than the plus threshold, a plus edge is set, and if the intensity difference is lower than the minus threshold, a minus edge is set. Then, the process proceeds to S24, and combinations of the plus edges and the minus edges and an alignment of the plus edges and an alignment of the minus edges are calculated. For example it is determined whether or not a series of the plus edges and the series of the minus edges are parallel and distanced each other at a predetermined length, which corresponds to a width of the parking stall line. On the basis of these combinations and the alignments, a pair of a plus edge line and a minus edge line are detected, and thus, a possible parking stall line can be selected from the image. Then, the process proceeds to S25, and end points of each of the plus edge line and a minus edge line, which are selected as the possible parking stall line, are searched. Finally, the right and left parking stall lines TL and TR and end points P1, P2, P3 and P4 shown in FIG. 10 are obtained as parking stall parameters in S25 and S26. At this point, if the right and left parking stall lines TL and TR and the end points P1, P2, P3 and P4 cannot be detected, the temporary parking target position k is set to be the parking target position K.

Figure 13:
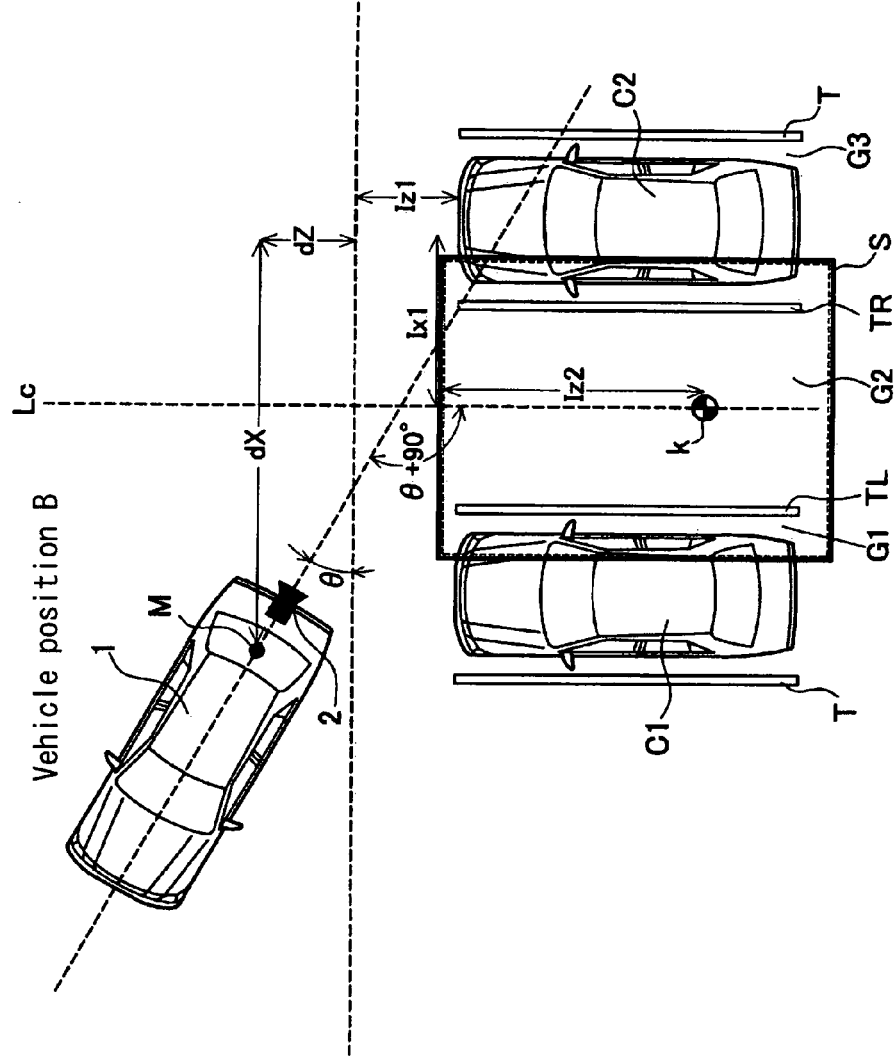
FIG. 13 illustrates a diagram indicating an alternative example of the parking assist device according to the present invention.
Figure 14:
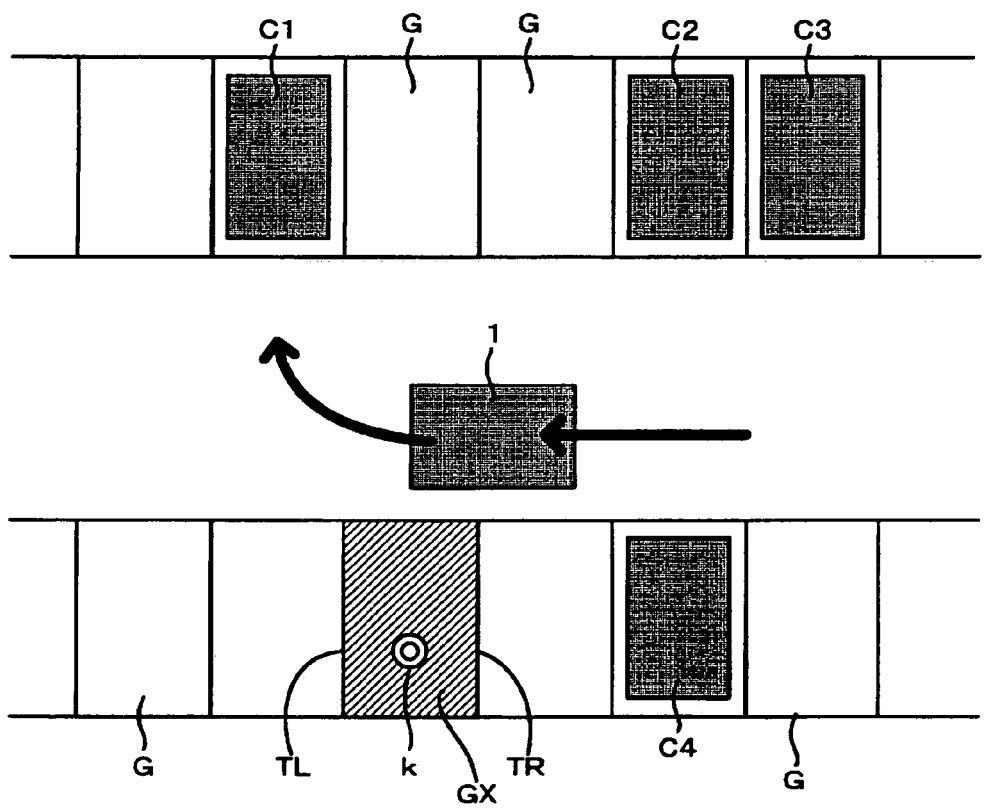
FIG. 14 illustrates a diagram indicating another alternative example of the parking assist device according to the present invention.

Then, in S5 illustrated in the flowchart in FIG. 5, a parking target frame W is calculated so as to be positioned to the central point M of the vehicle 1. The calculated parking target frame W is superposed on the image captured by the rear camera 2 and displayed on the display 3. This parking target frame W is considered as an initial position thereof. At this moment, as shown in FIG. 13, a position adjusting switch 25 is also displayed on the display 3 together with the captured rear image and the parking target frame W. If the parking target frame W is not positioned within the parking stall G2, into which the vehicle 1 will be parked, or if the vehicle 1 needs to be parked rightward within the parking stall G2 because a large-size car is parked on the left side of the parking stall G2, the driver can adjust the position of the parking target frame W within the parking stall G2 in S6. Specifically, the driver can move the parking target frame W in a vertical direction of the display 3 by pressing an upper direction arrow Y1 or a lower direction arrow Y2, which are appears on the display 3, and the driver can move the parking target frame W in a horizontal direction of the display 3 by pressing a left direction arrow Y3 and a right direction arrow Y4, which also appear on the display 3. Further, the driver can rotate the parking target frame W in a clockwise direction of an anticlockwise direction by pressing a rotational arrow Y5 and a rotational arrow Y6. In accordance with the adjustment of the position of the parking target frame W, a position of the parking target position K can also be adjusted automatically. When the driver turns on the parking assist stop switch 26, the parking assist operation can be stopped.

Then, in S7, a guide route, which is used for guiding the vehicle 1 from the vehicle position B to the parking target position K, is calculated. Then, the process proceeds to S8, and it is determined whether or not the driver adjusts the position of the parking target position K depending on whether or not the position adjusting switch 25 has been operated. When it is determined that the parking target position K has been adjusted by use of the position adjusting switch 25 (S8: YES), the process goes back to S7 and the guide route, which is used for guiding the vehicle 1 from the vehicle position B to an adjusted parking target position K', is calculated.

On the other hand, if it is determined that the parking target position K has not been adjusted by use of the position adjusting switch 25 (S8: NO), the driver turns on the confirmation switch 27 in order to determine that the parking target position K is confirmed. If the confirmation switch 27 has not been turned on (S9: NO), the process goes back to S8 and standby until the parking target position K is adjusted. Then, when it is detected that the confirmation switch 27 is turned on (S9: YES), the process proceeds to S10, and an announcement such as "parking assist operation now starts" is output from the speaker 16 in order to notify the driver of starting the operation.

In S11, the parking assist ECU 4 inputs a speed signal, which is detected and output by the rear-right wheel speed sensor 7 and the rear-left wheel speed sensor 8, input a steering angle signal detected and output by the steering angle sensor 5 in order to calculate the moving amount of the vehicle 1, and then a position of the vehicle 1 relative to the guide route is detected. In S12, a target steering angle relative to the guide route is calculated, and in S13, the steering actuator 9 is controlled on the basis of the target steering angle. In this configuration, the steering wheel of the vehicle 1 is automatically rotated, and, when the driver stomps on the accelerator, the vehicle 1 starts moving in a rear direction toward the parking target position K.

Then, in S14, it is determined whether or not the vehicle reaches the parking target position K. If it is determined that the vehicle 1 does not reach the parking target position K (S14: NO), the process goes back to S11 and continues to control the steering wheel. On the other hand, if it is determined that the vehicle 1 reaches the parking target position K (S14: YES), it is determined that the parking operation is finished, and then the parking assist operation is finished.

According to the parking assist ECU 4 in this embodiment, the movement of the vehicle can be detected by the vehicle detecting device 17, the steering angle and the vehicle wheel speed are memorized in the memory 28 as the vehicle moving trajectory. Further, the temporary parking target position estimating device 18 reads the vehicle moving trajectory from the memory 28 and obtains information about how the vehicle has moved, in order to assume the temporary parking target position k. Because the moving locus of the vehicle 1 may differ depending on driving characteristics of the driver or a situation of the parking, the temporary parking target position k may not be included in the parking stall G2. The parking assist ECU 4 of this embodiment sets the parking target position K as follows. First, the parking stall line searching area setting device 19 sets the parking stall line searching area S within which the parking stall line T will be searched on the basis of the temporary parking target position k. After the image captured by the rear camera 2 is inputted into the parking assist ECU 4, the parking stall line T is detected within the parking stall line searching area S I the image. At this point, because the parking stall line T is detected only from the parking stall line searching area S, disturbances (such as differences of levels of brightness, shadow of other vehicles C1 and C2, dirt on the load surface and the like), which occurs outside the parking stall line searching area S, can be eliminated, as a result, an accuracy on detecting the parking stall line T can be enhanced, and the number of the calculations for detecting the parking stall line T can be reduced. Thus, the parking stall line T can be determined by correcting the temporary parking target position k on the basis of the parking stall line T. Thus, the parking target position K can be determined with high accuracy, as a result, chances that the driver resets the parking target position K by means of the position adjusting switch 25 can be reduced. Further, because the parking stall line T can be detected from the parking stall line searching area S, comparing to a case when the parking stall line T is detected from an entire image, a time for detecting the parking stall line T can be shortened, as a result, a time for setting the parking target position K can also be shortened. Thus, according to the parking assist ECU 4, the parking target position K can be set with high accuracy and high speed, as a result, hassles for the user when the parking target position K is set can be reduced.

Further, according to the parking assist ECU 4 of the embodiment, in consideration of the driving characteristics, for example, temporally stopping the vehicle 1 by the side of the parking stall G2 so as to be perpendicular to the parking stall G2 when the driver intends to park the vehicle 1 into the parking stall G2, the temporary parking target position estimating device 19 calculates a first point, at which the vehicle 1 temporally stops, a deflection angle θ at which the vehicle 1 rotates from the first position, and a moving distance of the vehicle 1 from the first position to a second position, at which the vehicle 1 turns at the predetermined deflection angle θ, on the basis of the vehicle moving trajectory. Then, on the basis of these values, the temporally stop position (first position), the deflection angle θ and the moving distance; an angle of the parking stall G2 relative to the vehicle 1 is assumed, as a result, the temporary parking target position k is assumed. In this configuration, chances that the parking stall line T of the parking stall becomes out of the parking stall line setting area S can be reduced, as a result, chances that the parking stall line T is not detected or incorrectly detected can be reduced.

Furthermore, according to the parking assist ECU 4 of the embodiment, when the driver positions the shift lever to the reversed mode, the shift lever reverse switch 6 is turned on. Once the shift lever reverse switch 6 is turned on, the parking assist instruction is inputted into the temporary parking target position estimating device 19, and the temporary parking target position k is assumed by the temporary parking target position estimating device 19. On the basis of the assumed temporary parking target position k, in order to assist a parking operation of the vehicle 1, the parking stall line T is detected, and the parking target position is set. Thus, because the temporary parking target position k is assumed when the shift lever reverse switch 6 is turned on, in other words, the turned-on operation of the shift lever reverse switch 6 is considered as a trigger; chances that the temporary parking target position k is assumed when, for example, the driver doesn't need the parking assist operation, can be reduced, as a result, needless calculations can be reduced.

Furthermore, according to the parking assist ECU 4 of the embodiment, the left parking stall line searching area SL and the right parking stall line searching area SR are set separately, and each of the left parking stall line searching area SL and the right parking stall line searching area SR is scanned in order to detect the left parking stall line TL and the right parking stall line TR. Thus, elements such as intensity differences, which occur within an area defined between the right parking stall line TR and the left parking stall line TL, can be eliminate, as a result, an accuracy on detecting the right parking stall line TR and the left parking stall line TL can be enhanced. Further, the number of the calculations can be reduced; as a result, calculation costs can also be reduced.

Further, according to the parking assist ECU 4 of the embodiment, when the guide route calculating device 22 calculates the guide route by which the vehicle 1 is guided to move to the parking target position K, the steering wheel operation amount calculating device 23 calculates the steering wheel operation amount for the vehicle 1 on the basis of the guide route. Then, the steering wheel controlling device 24 automatically controls the steering wheel of the vehicle 1 on the basis of the steering wheel operation amount in order to park the vehicle 1 into the parking stall G2. In this configuration, even a driver who is not good at parking can park the vehicle 1 into the parking stall G2 without any trouble.

The present invention is not limited to the above embodiment, and can be altered as following examples or applied to many cases.

In the above embodiment, the right parking stall line searching area SR and the left parking stall line searching area SL are set separately, however, only one parking stall line searching area S, which includes both the right parking stall line searching area SR and the left parking stall line searching area SL, may be set as shown in FIG. 13. In this configuration, the parking stall line searching area S may be set so as to be larger than the parking stall G2 in order to detect each of the right parking stall lines TR and the left parking stall lines TL with high accuracy. Although the parking stall line searching area S may includes more noise, or it may require higher calculating costs, comparing to the case when the right and left parking stall lines TL and TR are set, a dispersion within the entire the parking stall line searching area S can be averaged in order to enhance the level of the accuracy of detecting the right parking stall line TR and the left parking stall line TL.

In the above embodiment, a case when the parking stall G2 is located on the left hand of the vehicle is explained, however, the present invention can be applied to a case when the parking stall G is located on right and left sides of the vehicle 1. In this case, even when a lot of parking stalls are not occupied, a parking stall GX, into which the driver intends to park the vehicle 1, can be assumed on the basis of the temporally stop position, the deflection angle and the moving distance, and then the temporary parking target position k is assumed. Then the parking stall line searching area S can be set, and finally the parking target position K can be set with high accuracy.

In the above embodiment, the shift lever reverse switch 6 is housed in the shift lever and automatically turned on and off when the shift lever is positioned to the reversed mode, however, this parking assist instruction switch can be provided, for example, at the center console, and can be turned on and off manually by the driver.

In the above embodiment, the temporary parking target position k is assumed on the basis of the temporally stop position, the deflection angle and the moving distance, however, the temporary parking target position k may be assumed on the basis of, for example only the deflection angle. In this configuration, the calculation costs can be reduced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A parking assist device for assisting a vehicle to travel to a parking target position comprising:
   a vehicle movement detector which detects movement of the vehicle;
   a storage device which stores the movement detected by the vehicle movement detector as a vehicle moving trajectory stored at the storage device;
   a temporary parking target position estimator which estimates a temporary parking target position based on variations of the vehicle moving trajectory; and
   a parking stall line searching area setting device which sets a parking stall line searching area within which the parking stall line is searched on the basis of the temporary parking target position which is estimated;
   a parking stall line detecting device which detects the parking stall line within the parking stall line searching area by an image recognition from an image captured by an imaging device; and
   a parking target position setting device which sets the parking target position on the basis of the parking stall line;
   wherein the parking stall line searching area setting device sets the parking stall line searching area so as to include a right parking stall line searching area in which a right parking stall line is detected, and a left parking stall line searching area in which a left parking stall line is detected;
   the left parking stall line searching area and the right parking stall line searching area are set so as to be wider than a size of the parking stall line and so as not to include three parking stall lines or more.

2. The parking assist device according to claim 1, wherein the temporary parking target position estimator calculates a deflection angle of the vehicle based on the vehicle moving trajectory and sets the temporary parking target position based on the deflection angle.

3. The parking assist device according to claim 1, wherein the temporary parking target position estimator calculates a temporary stopping position, a vehicle deflection angle relative to the temporary stopping position and a vehicle moving distance, and sets a temporary parking target position based on the vehicle temporary stopping position, the vehicle deflection angle and the vehicle moving distance.

4. The parking assist device according to claim 1, further comprising a parking assist instruction switch which outputs a parking assist instruction, and when the parking assist instruction is input into the temporary parking target position estimator, the temporary parking target position estimator estimates the temporary parking target position.

5. The parking assist device according to claim 1, further comprising:
   a guide route calculator which calculates a guide route by which the vehicle is guided to the parking target position;
   an steering wheel operation amount calculator which calculates a steering wheel operation amount of the vehicle on the basis of the calculated guide route; and
   a steering wheel controller, which automatically controls the steering wheel operation of the vehicle on the basis of the steering wheel operation amount which is calculated.

6. The parking assist device according to claim 3, further comprising a parking target position estimator which sets the parking target position when a shift lever is positioned to a reversed mode.

7. The parking assist device according to claim 1, wherein the right parking stall line searching area and the left parking stall line searching area are set to be larger respectively than an area of the right parking stall line and the left parking stall line.

8. The parking assist device according to claim 1, wherein the parking stall line searching area setting device sets a single parking stall line searching area so as to include the left parking stall line and the right parking stall line.

9. The parking assist device according to claim 8, wherein the parking stall line searching area setting device sets the parking stall line searching area so as to be larger than an area of the parking stall.

10. The parking assist device according to claim 1, wherein the parking stall line searching area setting device sets a portion of the image captured by the imaging device as the parking stall line searching area.

* * * * *